United States Patent Office 2,797,808
Patented July 2, 1957

---

2,797,808

FLOTATION OF IRON OXIDE AND OTHER NON-SULFIDE MINERALS

Elmer C. Tveter, Walnut Creek, and John C. Lokken, Berkeley, Calif., assignors to The Dow Chemical Company, Midland, Mich., a corporation of Delaware No Drawing. Application March 16, 1954,
Serial No. 416,693

8 Claims. (Cl. 209—166)

This invention relates to an improved method for the flotation concentration of non-sulfide minerals from ore pulps containing ions which interfere with the collection and flotation of the desired mineral and which are capable of forming insoluble sulfides.

A typical problem is presented by various iron-oxide containing ores. Many iron ore deposits yield a mineral of high enough iron content to be useful directly in smelting operations without need for flotation concentration. As such deposits become depleted, the marginal ore is of lower grade, being mixed with any of a variety of undesired siliceous, argillaceous or calcareous minerals. It would be desirable to be able to concentrate the iron values from such an ore by an economical flotation process so that even the low grade deposits of iron oxide minerals may be worked profitably. Prior flotation concentration practices have not recovered as much of the iron oxide minerals as desired from such ores, and the iron content of the recovered concentrates has not been as high, in most cases, as that in good grades of limonite, hematite, or magnetite. It would be especially helpful to have a method for the economical recovery of iron oxide minerals from an ore pulp containing slimes as well as sands, since the slimes from many ferrous ores interfere with standard flotation procedures and suppress the yield and quality of the flotation concentrate.

The standard procedure for the flotation concentration of iron oxides uses fatty acids or other anionic collectors, which are commonly diluted with mineral oil, and there may be used in the aqueous phase one or a mixture of such dispersants as soda ash and sodium silicate, and a frothing agent. The gangue material, principally quartz, can be separated readily in high grade ores, but in low grade ores the quartz and other gangue is in an activated condition which makes it difficult to suppress its flotation when enough of the collector is used to obtain good iron recovery. Hence, the use of enough of the expensive fatty acid to collect a practical proportion of the original amount of iron results in a concentrate containing undesirable amounts of sands, slimes and other impurities.

A similar problem is encountered with many other ores from which it is desired to recover non-sulfide minerals. Thus, it is found on occasion that such minerals cannot be concentrated effectively by the usual flotation concentration procedures because the ore pulps contain ions which interfere with the process, possibly by activating gangue minerals, or by depressing the desired mineral, or by consuming the collector reagent. Ions of copper, lead, iron and manganese, if present in solution in ore pulps, interfere with the flotation concentration of iron oxide minerals, manganese oxide minerals, tungstic oxide minerals and other non-sulfide minerals, and a method is needed to accomplish the suppression of the adverse effects of such ions.

It is the principal object of the invention to provide a method for the flotation concentration of non-sulfide minerals from ore pulps containing ions which normally tend to interfere with the effective recovery of the desired mineral.

A related object is to provide such a method for use in the recovery of iron oxide minerals, manganese oxide minerals or tungstic oxide minerals from ores containing them. A specific object is to provide an improved flotation concentration method for the economical recovery of the iron values from iron oxide ores such that there is obtained a concentrate of quality suitable for smelting.

The desired improved results are attained, in accordance with the present invention, by adding to the ore, suitably in the pulping mill, from 0.02 to 2 pounds of a water-soluble inorganic sulfide per ton of ore and subjecting the pulp to froth flotation using an anionic collector and, if desired, an alkaline dispersant as in prior practice. The presence of an alkaline sulfide in the pulp makes possible a significant reduction in the amount of collector required and results in an increase both in the quality of the concentrate and in the total recovery of mineral values from the initial ore.

The flotation concentration of iron oxide minerals is illustrated in the following Examples 1–3 in which the prior standard practice is compared with the improved procedure of the present invention. Examples 4 and 5 show the application of the invention to manganese and tungsten ores.

EXAMPLE 1

An iron oxide ore assaying about 38.5 percent iron, was crushed and screened through a 10 mesh sieve (U. S. Sieve Series). Portions of this ore weighing 500 grams were ground with 200 ml. of water, and in some instances with a soluble sulfide, for 5 minutes in a ball mill. Slime was decanted from the ground ore, and 400 ml. of the so-thickened pulp was conditioned for 2 minutes with the reagents shown in Table 1. The conditioned pulp was diluted and subjected to a two-stage flotation cycle in a 2750-ml. "Denver" Laboratory flotation cell. The frothing agent used was a 50 percent solution of the methyl ethers of mixed tri- and higher polypropylene glycols ("Dowfroth 250") in light fuel oil. The significance of the results is pointed out following Table 1.

Table I
[Effect of Sodium Sulfide on Deslimed Taconite Ore Flotation]

| Test No. | Reagents, pounds/ton of ore | | | | Froth | | Product | Percent Wt. | Assay, percent | | Distribution, percent Fe |
|---|---|---|---|---|---|---|---|---|---|---|---|
| | Added in ball mill, Na₂S | Pulp Conditioner | | | stage | Time, min. | | | Fe | Insol. | |
| | | Na₂S | Red Oil | Frother | | | | | | | |
| I-A | | | 0.5 | 0.10 | rougher | 5 | rougher concentrate | 23.8 | 53.2 | 21.1 | 32.9 |
| | | | 0.03 | 0.20 | cleaner | 3 | do | 22.4 | 55.2 | 18.6 | 32.1 |
| | | | | | | | cleaner tailings | 1.4 | 21.7 | 61.0 | 0.8 |
| | | | | | | | rougher tailings | 69.7 | 35.7 | | 64.7 |
| | | | | | | | slimes | 6.5 | 14.0 | | 2.4 |
| | | | | | | | ore heads | 100.0 | 38.5 | | 100.0 |
| I-B | 0.20 | 0.20 | 0.5 | 0.20 | rougher | 2 | rougher concentrate | 64.4 | 55.7 | 19.6 | 92.9 |
| | | | | | cleaner | 2 | do | 44.7 | 66.6 | 5.2 | 77.2 |
| | | | | | | | cleaner tailings | 19.7 | 30.8 | 52.4 | 15.7 |
| | | | | | | | rougher tailings | 28.2 | 7.1 | | 5.2 |
| | | | | | | | slimes | 7.4 | 10.0 | | 1.9 |
| | | | | | | | ore heads | 100.0 | 38.6 | | 100.0 |
| I-C | 0.5 | 0.5 | 0.5 | 0.15 | rougher | 2 | rougher concentrate | 62.4 | 58.2 | 16.3 | 93.8 |
| | | | | 0.05 | cleaner | 2 | do | 36.7 | 68.4 | 3.2 | 64.8 |
| | | | | | | | cleaner tailings | 25.7 | 43.6 | 35.1 | 29.0 |
| | | | | | | | rougher tailings | 30.2 | 5.4 | | 4.2 |
| | | | | | | | slimes | 7.4 | 10.3 | | 2.0 |
| | | | | | | | ore heads | 100.0 | 38.7 | | 100.0 |

Test I-A employed only the frother and commercial oleic acid (Red oil). After a single cleaning, the concentrate assayed 55.2 percent iron, and contained only 32.1 percent of the iron from the original ore. Test I-B used slightly less of the anionic collector and somewhat less of the frother, but used 0.4 pound of sodium sulfide per tone of ore. In this test, flotation was much faster, requiring only 4 minutes through a cleaning step, instead of 8 minutes, and the cleaner concentrate assayed 66.6 percent iron and contained 77.2 percent of the iron in the ore. Similar results were obtained in test I-C, using 1.0 pound of sodium sulfide per ton of ore.

EXAMPLE 2

A raw ore of 38.5 percent iron assay was subjected to the same type of treatment as described in Example 1, except that all sodium sulfide was added in the ball mill. The anionic collector was a commercial mixture of oleic and linoleic acids (Armour and Co., "Neo-Fat S-142"). A 2-minute conditioning preceded the rougher flotation and a 1-minute conditioning preceded the single cleaner flotation. When a frother was used, it was the same as in Example 1, and other reagents are identified in Table II. One batch was given a 3-stage flotation (two cleaning stages).

Test II-A may be considered a standard run, using the amounts of fatty acid and fuel oil needed to get a high recovery of iron values from the ore. The reagent combination in test II-A resulted in an iron recovery in the rougher concentrate equal to that in test I-B, although the assay of the rougher concentrate in test II-A is 11.8 percent lower than that in test I-B. This shows the 0.5 pound of fatty acid and 0.4 pound of sodium sulfide (test I-B) produce results equal to or better than those using 1.5 pounds of fatty acid and 1.8 pounds of fuel oil, without the sulfide (test II-A).

Tests II-B and II-C also show the improved concentrate grade and iron recovery, when using sodium sulfide. In these tests, the fuel oil was omitted, and in test II-C the amount of fatty acid was reduced, without loss of iron values. The amount of fatty acid used as collector was greater in tests II-B and II-C than is required when using sodium sulfide, but a high grade of concentrate was obtained despite this fact after only one or two cleaning operations.

EXAMPLE 3

A lower grade (33% Fe) and more refractory iron ore was used, and flotation was effected both on "raw" and on deslimed ore. The reagents used were limited to the sulfide or polysulfide shown in Table III, oleic acid, and the same frothing agent as identified in Example 1. In some cases the sulfide was added to the ball mill grind, and in the others it was added to the pulp in the conditioner. The flotation cell used in the tests reported in Table III was a 2500 ml. Fagergren machine. Froth time was 4 minutes in the rougher stage and 2 minutes in the cleaner stage.

Table II

| Test No. | Reagents, pounds per ton of ore | | | | | | Froth | | Product | Percent Wt. | Assay, Percent | | Distribution Percent Fe |
|---|---|---|---|---|---|---|---|---|---|---|---|---|---|
| | Grind | Conditioner | | | | | Time, min. | pH | | | Fe | Insol. | |
| | Na₂CO₃ | Na₂S | Na₂SiO₃ | Fatty Acid | Fuel Oil | Frother | | | | | | | |
| II-A | 0.5 | | 0.4 | 1.5 | 1.8 | | 4 | 9.0 | Rougher concentrate | 81.6 | 43.9 | 35.5 | 93.1 |
| | | | | | | | 3 | 8.9 | Cleaner concentrate | 65.5 | 51.5 | 24.8 | 87.7 |
| | | | | | | | | | Cleaner tailings | 16.1 | 12.8 | 79.0 | 5.4 |
| | | | | | | | | | Rougher tailings | 18.4 | 14.5 | 81.7 | 6.9 |
| | | | | | | | | | Ore heads | 100.0 | 38.5 | 44.0 | 100.0 |
| II-B | 0.5 | 0.5 | 0.4 | 1.5 | | 0.10 | 4 | 9.3 | Rougher concentrate | 67.1 | 55.2 | 19.6 | 96.3 |
| | | | | | | | 3 | 8.9 | Cleaner concentrate | 59.3 | 61.1 | 11.8 | 94.1 |
| | | | | | | | | | Cleaner tailings | 7.8 | 10.8 | 79.2 | 2.2 |
| | | | | | | | | | Rougher tailings | 32.9 | 4.4 | 93.6 | 3.7 |
| | | | | | | | | | Ore heads | 100.0 | 38.5 | 44.0 | 100.0 |
| II-C | 0.5 | 0.5 | 1.0 | | | | 3 | 9.0 | Rougher concentrate | 71.8 | 51.6 | 25.0 | 96.2 |
| | | | | | | | 2 | 8.3 | Cleaner concentrate | 62.0 | 58.2 | 16.0 | 93.9 |
| | | | | | | | 2 | 8.2 | Recleaner conc | 57.1 | 62.2 | 10.6 | 92.3 |
| | | | | | | | | | Recleaner tailings | 4.9 | 12.6 | 78.0 | 1.6 |
| | | | | | | | | | Cleaner tailings | 9.8 | 9.2 | 82.0 | 2.3 |
| | | | | | | | | | Rougher tailings | 28.2 | 5.1 | 91.9 | 3.8 |
| | | | | | | | | | Ore heads | 100.0 | 38.5 | 43.8 | 100.0 |

Table III
[Treatment of low-grade refractory iron ore]
RAW ORE

| Test No. | Sulfide Type | Pound/ton | Red Oil | Frother | Flotation pulp, pH | Product | Percent Wt. | Assay, Percent Fe | Assay, Percent Insol. | Iron Recovery, Percent |
|---|---|---|---|---|---|---|---|---|---|---|
| III-A | | | 0.60 | 0.04 | 7.8 | Rougher concentrate | 64.8 | 45.5 | 33.9 | 89.7 |
|  | | | | 0.02 | 7.8 | Cleaner concentrate | 54.4 | 51.0 | 26.2 | 84.3 |
| III-B | (NH₄)₂S | 0.10 | 0.30 | 0.04 | 7.8 | Rougher concentrate | 76.2 | 40.6 | 41.8 | 93.9 |
|  | | | | | | Cleaner concentrate | 38.5 | 63.0 | 11.0 | 73.6 |

DESLIMED ORE

| Test No. | Sulfide Type | Pound/ton | Red Oil | Frother | Flotation pulp, pH | Product | Percent Wt. | Assay, Percent Fe | Assay, Percent Insol. | Iron Recovery, Percent |
|---|---|---|---|---|---|---|---|---|---|---|
| III-C | | | 0.30 | 0.04 | 7.8 | Rougher concentrate | 41.8 | 41.9 | 40.6 | 53.0 |
|  | | | | | 7.8 | Cleaner concentrate | 26.9 | 51.8 | 24.5 | 42.2 |
| III-D | (NH₄)₂S | 0.05 | 0.30 | 0.04 | 7.8 | Rougher concentrate | 44.8 | 45.4 | 36.2 | 61.6 |
|  | | | | 0.01 | 7.8 | Cleaner concentrate | 29.7 | 56.9 | 19.6 | 51.2 |
| III-E | Na₂S | 0.20 | 0.30 | 0.02 | 7.8 | Rougher concentrate | 49.1 | 47.5 | 34.0 | 71.2 |
|  | | | | 0.04 | 7.8 | Cleaner concentrate | 34.3 | 61.0 | 14.5 | 64.0 |
| III-F | (NH₄)₂S | 0.05 | 0.30 | 0.02 | 8.9 | Rougher concentrate | 42.6 | 54.8 | 24.0 | 70.7 |
|  | | | | 0.04 | 7.9 | Cleaner concentrate | 32.4 | 64.3 | 11.6 | 63.3 |
| III-G | Na₂S | 0.40 | 0.30 | 0.04 | 8.5 | Rougher concentrate | 86.9 | 36.0 | 49.5 | 95.0 |
|  | | | | 0.08 | 7.8 | Cleaner concentrate | 41.6 | 63.2 | 12.5 | 79.8 |

NOTES.—In Tests III-B and III-G, the sulfides were added to the ball mill grind. In Tests III-F and III-G, 1.0 pound of NaOH added to pulp, per ton of ore.

Table III shows that ammonium sulfide and polysulfide are at least as effective as sodium sulfide. In the tests on this low grade ore, no concentrate grades of over 60 percent iron were obtained in a single cleaning operation except when sulfides were used. The use of as little as 0.05 pound of ammonium polysulfide per ton of ore increased the concentrate grade at least 5 percent, and 0.10 pound of ammonium sulfide increased the concentrate grade about 12 percent. Improved results are obtained when the water-soluble sulfide is added at the grinding stage, and when the pulp is made more alkaline than normal.

EXAMPLE 4

A low grade manganese ore, containing 3.65 percent of manganese, present as carbonate, and 7.7 percent of sulfur, present as insoluble sulfides, and containing soluble salts whose ions interfered with normal flotation of the manganese values, was crushed to 10-mesh size. 600 grams of this ore, 400 ml. of water, and 4.0 pounds per ton of ore of soda ash were ground in a ball mill. The pulp was mixed with 0.50 pound per ton of ore of cupric sulfate, 0.15 pound per ton of ore of sodium isopropyl xanthate and 0.05 pound per ton of ore of the methyl ethers of mixed tri- and higher polyproplene glycols ("Dowfroth 250"), diluted with water, and subjected to flotation at pH 7.9 in a laboratory flotation cell of about 2 liters capacity. Froth was withdrawn for 10 minutes, carrying with it much of the insoluble sulfide minerals native to this ore. The tailings from the sulfide flotation were thickened to 800 ml. and the following conditioning agents were added:

Soda ash _____ 2.0 pound per ton of ore.
Sodium silicate _____ 2.0 pound per ton of ore.
Sodium sulfide _____ As shown in Table IV.
Anionic collector (fatty acid) ___ 0.25 pound per ton of ore.

After conditioning for 2 minutes, manganese rougher flotation was effected at pH 9.5 for 10 minutes, while adding 0.40 pound, per ton of ore, of the oleic-linoleic acid collector. A manganese cleaner flotation was then carried out for 2 minutes at pH 8.9 on the rougher concentrate after addition of 0.02 pound, per ton of ore, of the polyglycol ether frothing agent.

It was observed that in the standard procedure (test No. IV-A), in which no soluble sulfide was added, the manganese assay in the cleaner concentrate and the manganese recovery were both significantly lower than when sodium sulfide was used (test No. IV-B) in the method of the present invention. The results appear in Table IV.

Table IV

| Test No. | Na₂S, pound/ton | Product | Percent Wt. | Assay, Percent Mn | Assay, Percent S | Assay, Percent Insol. | Distribution, Percent Mn | Distribution, Percent S |
|---|---|---|---|---|---|---|---|---|
| IV-A | None | Sulfide concentrate | 20.15 | 0.90 | 32.00 | 13.2 | 5.0 | 83.6 |
|  |  | Mn Cleaner concentrate | 14.94 | 15.80 | 5.10 | 43.3 | 64.7 | 9.9 |
|  |  | Mn Cleaner tailings | 4.96 | 4.20 | 1.95 | 74.7 | 5.7 | 1.2 |
|  |  | Rougher tailings | 59.95 | 1.50 | 0.68 |  | 24.6 | 5.3 |
|  |  | Ore heads | 100.00 | 3.65 | 7.71 |  | 100.0 | 100.0 |
| IV-B | 0.5 | Sulfide concentrate | 21.60 | 0.38 | 31.80 | 13.1 | 2.2 | 89.0 |
|  |  | Mn Cleaner concentrate | 11.81 | 20.90 | 2.75 | 38.6 | 67.7 | 4.2 |
|  |  | Mn Cleaner tailings | 3.83 | 5.30 | 2.20 | 70.4 | 5.6 | 1.1 |
|  |  | Rougher tailings | 62.76 | 1.42 | 0.70 |  | 24.5 | 5.7 |
|  |  | Ore heads | 100.00 | 3.65 | 7.72 |  | 100.0 | 100.0 |

EXAMPLE 5

The effect of sodium sulfide on the concentrate grade and recovery of tungsten minerals was determined on a finely disseminated scheelite ore. In one test (No. V-A), following standard procedure, no sodium sulfide was used, either in the sulfide flotation step or in the tungsten flotation. There was ground in a ball mill a mixture of 500 grams (finer than 10 mesh) of the ore, 300 ml. of water, 2.0 pounds per ton of ore of soda ash, and the amount of sodium sulfide shown (test No. V-B only) in Table V. The pulp was diluted and subjected to flotation to remove insoluble sulfides using 0.10 pound of sodium isopropyl xanthate and 0.12 pound of the polypropylene glycol ether frothing agent, per ton of ore. The aqueous phase was at pH 9.0, and froth was withdrawn for 4 minutes. The tailings from the sulfide flotation were conditioned with the following reagents:

Soda ash_____ 2.0 pounds per ton of ore.
Sodium sulfide_____ As shown in Table V.
Sodium silicate_____ 1.0 pound per ton of ore.
Quebracho_____ 0.20 pound per ton of ore.
Anionic collector (fatty acid)__ 0.40 pound per ton of ore.

The collector was stage added during the 4-minute frothing to which the alkaline (pH 9.8) mixture was subjected while withdrawing the tungsten concentrate. It is seen, again, that higher concentrate grade and greater recovery are obtained when using the process of the present invention.

Table V

| Test No. | $Na_2S$, Pound/ton | Product | Percent Wt. | Percent Assay | | | Distribution, percent | |
|---|---|---|---|---|---|---|---|---|
| | | | | $WO_3$ | S | Insol. | $WO_3$ | S |
| V-A | None | Sulfide concentrate | 3.47 | 0.125 | 31.10 | 16.2 | 0.5 | 86.2 |
| | None | $WO_3$ concentrate | 5.09 | 12.90 | 0.70 | 17.6 | 82.3 | 2.9 |
| | | Rougher tailings | 91.44 | 0.15 | 0.15 | | 17.2 | 10.9 |
| | | Ore heads | 100.00 | 0.80 | 1.25 | | 100.0 | 100.0 |
| V-B | 0.5 | Sulfide concentrate | 3.61 | 0.30 | 31.30 | 16.2 | 1.3 | 88.7 |
| | | $WO_3$ concentrate | 3.71 | 18.00 | 0.50 | 18.9 | 84.1 | 1.5 |
| | | Rougher tailings | 92.68 | 0.125 | 0.135 | | 14.6 | 9.8 |
| | | Ore heads | 100.00 | 0.79 | 1.27 | | 100.0 | 100.0 |

The invention has been illustrated with respect to the use of sodium sulfide, ammonium sulfide, and ammonium polysulfide. Tests indicate that any water-soluble inorganic sulfide is useful, and the term "sulfide" is used here to include the polysulfides. Sodium sulfide is the most readily available and the most inexpensive of these reagents, and its use is preferred.

It is known that sodium sulfide has been used, in large amounts ranging from 5 to 50 pounds per ton of ore, to condition non-sulfide copper ores for flotation, and that such conditioning requires generally 30 minutes or more. The use of such sulfides in amounts of 0.02 to 2 pounds (preferably 0.2 to 0.4 pound) per ton of an iron oxide ore, to upgrade the flotation concentrate and to permit a saving of from 0.5 to 1 pound of anionic collector and up to 1.8 pounds of mineral oil is both novel and unexpected. The sulfides in the present process appear to suppress activation of the gangue minerals and thus the sulfides increase the recovery of non-sulfide mineral values, and improve the grade of the concentrate.

The method of the invention is applicable with advantage to any iron oxide ore, including but not limited to those which contain limonite, hematite, magnetite, turgite, goethite, or ilmenite. (The term "taconite" used in Table I herein is a localized designation in the Lake Superior region for any of a variety of iron oxide ores produced in that region.) The invention is applicable as well to numerous other ores containing a non-sulfide mineral to be recovered and water-soluble salts or oxides whose ions tend to interfere with normal flotation practice.

We claim:
1. In the flotation concentration of non-sulfide minerals, selected from the class consisting of iron oxide minerals, manganese oxide minerals and tungstic oxide minerals, containing soluble ions which interfere with normal flotation procedures, using an anionic collector, the improvement which consists in effecting the flotation of the non-sulfide mineral in the presence of an added amount of from 0.02 to 2 pounds per ton of ore of a water-soluble inorganic sulfide.

2. The improvement claimed in claim 1, wherein the sulfide employed in sodium sulfide.

3. The improvement claimed in claim 1, wherein the sulfide employed is ammonium sulfide.

4. The improvement claimed in claim 1, wherein the sulfide employed is ammonium polysulfide.

5. The improvement claimed in claim 1, wherein the ore pulp is conditioned to a pH greater than 8 before flotation.

6. The improvement claimed in claim 1, wherein the mineral to be recovered is a manganese mineral.

7. The improvement claimed in claim 1, wherein the mineral to be recovered is a tungsten mineral.

8. The improvement claimed in claim 1, wherein the mineral to be recovered is an iron oxide mineral.

References Cited in the file of this patent

UNITED STATES PATENTS

| | | |
|---|---|---|
| 1,497,310 | Tucker | June 10, 1924 |
| 1,838,422 | Littleford et al. | Dec. 29, 1931 |
| 2,231,265 | Gaudin | Feb. 11, 1941 |

OTHER REFERENCES

U. S. Bureau of Mines Report of Investigations, 3105, dated March 1931—9 pages. (Copy available in Scientific Library.)

Handbook of Mineral Dressing, Taggart, C. 1945, John Wiley & Sons, page 12–120. Copy in Division 55.)

UNITED STATES PATENT OFFICE

CERTIFICATE OF CORRECTION

Patent No. 2,797,808            July 2, 1957

Elmer C. Tveter et al.

It is hereby certified that error appears in the printed specification of the above numbered patent requiring correction and that the said Letters Patent should read as corrected below.

Columns 3 and 4, Table I, under the heading "Product", lines 2, 8, and 14, for "do", in each occurrence, read -- cleaner concentrate --; column 8, line 31, for "in" read -- is --.

Signed and sealed this 19th day of November 1957.

(SEAL)
Attest:
KARL H. AXLINE

Attesting Officer

ROBERT C. WATSON
Commissioner of Patents